United States Patent
Li et al.

(10) Patent No.: US 12,250,149 B2
(45) Date of Patent: Mar. 11, 2025

(54) DATA ROUTING METHOD AND RELATED APPARATUS

(71) Applicant: Tencent Technology (Shenzhen) Company Limited, Shenzhen (CN)

(72) Inventors: Maocai Li, Shenzhen (CN); Zongyou Wang, Shenzhen (CN); Jinsong Zhang, Shenzhen (CN); Huankun Huang, Shenzhen (CN); Kaiban Zhou, Shenzhen (CN); Yifang Shi, Shenzhen (CN); Qucheng Liu, Shenzhen (CN); Pan Liu, Shenzhen (CN); Hu Lan, Shenzhen (CN); Changqing Yang, Shenzhen (CN); Gengliang Zhu, Shenzhen (CN); Li Kong, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 351 days.

(21) Appl. No.: 17/740,974

(22) Filed: May 10, 2022

(65) Prior Publication Data

US 2022/0272038 A1    Aug. 25, 2022

Related U.S. Application Data

(63) Continuation of application No. PCT/CN2021/090446, filed on Apr. 28, 2021.

(30) Foreign Application Priority Data

Apr. 28, 2020  (CN) .......................... 202010351450.0

(51) Int. Cl.
*H04L 45/748* (2022.01)
*H04L 45/48* (2022.01)

(52) U.S. Cl.
CPC ............ *H04L 45/748* (2013.01); *H04L 45/48* (2013.01)

(58) Field of Classification Search
CPC .............................. H04L 45/748; H04L 45/48
See application file for complete search history.

(56) References Cited

U.S. PATENT DOCUMENTS

| 10,789,215 B1* | 9/2020 | Tian ...................... G06F 3/0658 |
| 2013/0034096 A1* | 2/2013 | Hu .......................... H04L 45/54 370/389 |
| 2020/0201846 A1* | 6/2020 | Yang ..................... H04L 9/3239 |

FOREIGN PATENT DOCUMENTS

| CN | 107358420 A | 11/2017 |
| CN | 109255713 A | 1/2019 |

(Continued)

OTHER PUBLICATIONS

International Search Report and Written Opinion received for Application No. PCT/CN2021/090446 mailed Jul. 26, 2021 (English and Chinese Languages) (10 pages).

(Continued)

*Primary Examiner* — Duc C Ho
(74) *Attorney, Agent, or Firm* — Banner & Witcoff, Ltd.

(57) ABSTRACT

Data routing with a forwarding process of service data can avoid problems of offline nodes. The forwarding process for data routing can also improve the fault tolerance and service data can be quickly transmitted to a corresponding data pool. Using consensus nodes and a target data pool with routing and forwarding tables along with subtrees from a trie tree can improve the routing. Subtrees may be obtained by splitting the trie tree from a root node by using a first leaf node as a benchmark, which correspondingly represents a data pool of the consensus node. The routing and forwarding table is configured to record addresses of data pools corre- (Continued)

spondingly represented by a preset quantity of leaf nodes in a corresponding subtree.

20 Claims, 6 Drawing Sheets

(56) References Cited

FOREIGN PATENT DOCUMENTS

| | | |
|---|---|---|
| CN | 110035009 A | 7/2019 |
| CN | 110049087 A | 7/2019 |
| CN | 110602148 A | 12/2019 |
| CN | 110602239 A | 12/2019 |
| CN | 110800008 A | 2/2020 |
| CN | 111553669 A | 8/2020 |
| EP | 3 512 166 A1 | 7/2019 |

OTHER PUBLICATIONS

Search Report for Application No. 202010351450.0 dated May 27, 2021 (Chinese language) (9 pages).

* cited by examiner

Second leaf node: shortest prefix 1100          First leaf node: shortest prefix 0011

DATA ROUTING METHOD AND RELATED APPARATUS

RELATED APPLICATION

This application is a continuation of PCT Application No. PCT/CN2021/090446, filed Apr. 28, 2021, published as WO 2021/218984 A1, entitled "DATA ROUTING METHOD AND RELATED APPARATUS", which claims priority to Chinese Patent Application No. 202010351450.0, entitled "TRANSACTION ROUTING METHOD, APPARATUS, AND COMPUTER-READABLE STORAGE MEDIUM" filed on Apr. 28, 2020, both of which are incorporated by reference in their entirety.

FIELD OF THE TECHNOLOGY

This application relates to the field of computer technologies, and in particular, to data routing.

BACKGROUND OF THE DISCLOSURE

In an existing blockchain network, in a process that a data pool of a node transmits a transaction to a specific data pool, the transaction is usually forwarded by data pools of a plurality of nodes. However, if a node goes online or offline during the forwarding period, it is very likely to affect a forwarding process of service data. For example, a data pool of a third node and a data pool of a fourth node need to participate in forwarding when a data pool of a first node transmits service data to a data pool of a second node, that is, the data pool of the first node first transmits the service data to the data pool of the third node, the data pool of the third node forwards the service data to the data pool of the fourth node, and then the data pool of the fourth node forwards the service data to the data pool of the second node. However, if the fourth node goes offline, the forwarding of the service data may temporarily stop, and the service data may be forwarded to the data pool of the second node only after the fourth node is online again.

SUMMARY

Embodiments of this application provide a data routing method and a related apparatus, which can ensure that a forwarding process of service data cannot be affected by online or offline of a single node, and fault tolerance is strong, so that the service data can be quickly transmitted to a corresponding data pool.

One embodiment provides a data routing method, applicable to a blockchain network, the blockchain network including a plurality of consensus nodes, the plurality of consensus nodes maintaining respectively corresponding data pools, and the method including:

determining, by a first consensus node when service data is received, a target data pool corresponding to the service data, the first consensus node being any one of the plurality of consensus nodes;

obtaining, by the first consensus node, an address of a second data pool from a plurality of routing and forwarding tables according to a shortest prefix of the target data pool, where the plurality of routing and forwarding tables correspond to a plurality of subtrees of a trie tree, the trie tree includes a plurality of leaf nodes, the leaf nodes correspond to the data pools of the consensus nodes one by one, a leaf node corresponding to the second data pool and a leaf node corresponding to the target data pool are in a same subtree, the plurality of subtrees are obtained by splitting the trie tree from a root node by using a first leaf node corresponding to a data pool of the first consensus node as a benchmark, and the routing and forwarding tables are configured to record addresses of data pools represented by a preset quantity of leaf nodes in the corresponding subtrees; and transmitting, by the first consensus node, the service data to a consensus node corresponding to the address of the second data pool.

Another embodiment provides a data routing apparatus, applicable to a first consensus node in a blockchain network, the blockchain network including a plurality of consensus nodes, the first consensus node being any one of the plurality of consensus nodes, the plurality of consensus nodes maintaining respectively corresponding data pools, and the apparatus including:

a receiving module, configured to receive service data;

a determining module, configured to determine a target data pool corresponding to the service data when the receiving module receives the service data;

an obtaining module, configured to obtain an address of a second data pool from a plurality of routing and forwarding tables according to a shortest prefix of the target data pool, where the plurality of routing and forwarding tables correspond to a plurality of subtrees of a trie tree, the trie tree includes a plurality of leaf nodes, the leaf nodes correspond to the data pools of the consensus nodes one by one, a leaf node corresponding to the second data pool and a leaf node corresponding to the target data pool are in a same subtree, the plurality of subtrees are obtained by splitting the trie tree from a root node by using a first leaf node corresponding to a data pool of a first consensus node as a benchmark, the routing and forwarding tables are configured to record addresses of data pools represented by a preset quantity of leaf nodes in the corresponding subtrees, and the first consensus node is any one of the plurality of consensus nodes; and a transmit module, configured to transmit the service data to a consensus node corresponding to the address of the second data pool.

Another embodiment provides a non-transitory computer-readable storage medium, the computer storage medium storing a computer program, the computer program including program instructions, the program instructions, when executed by a processor, being configured to perform the data routing method according to the foregoing embodiments.

Another embodiment provides a computer device, including:

a processor, a communication interface, a memory, and a communication bus;

the processor, the communication interface, and the memory communicating with each other by using the communication bus; the communication interface being an interface of a communication module;

the memory being configured to store program code, and transmit the program code to the processor; and the processor being configured to invoke instructions of the program code in the memory to perform the data routing method according to the foregoing embodiments.

Another embodiment provides a computer program product including instructions, the computer program product, when run on a computer, causing the computer to perform the data routing method according to the foregoing embodiments.

In the embodiments of this application, a consensus node determines, when service data is received, a target data pool corresponding to the service data; the consensus node obtains an address of a second data pool from a plurality of routing and forwarding tables according to a shortest prefix of the target data pool, where the plurality of routing and forwarding tables correspond to a plurality of subtrees of a trie tree, the trie tree includes a plurality of leaf nodes, the leaf nodes correspond to data pools of consensus nodes one by one, a leaf node corresponding to the second data pool and a leaf node corresponding to the target data pool are in a same subtree, the plurality of subtrees are obtained by splitting the trie tree from a root node by using a first leaf node corresponding to a data pool of a first consensus node as a benchmark, and the routing and forwarding tables are configured to record addresses of data pools represented by a preset quantity of leaf nodes in the corresponding subtrees; and the consensus node transmits the service data to a consensus node corresponding to the address of the second data pool. In this way, a consensus node in which each data pool is located can effectively manage states of local nodes in a blockchain network. Because the routing and forwarding tables record the addresses of the data pools represented by the preset quantity of leaf nodes, effective consensus nodes may be determined based on the routing and forwarding tables when a consensus node goes offline in a forwarding process, to complete forwarding. In this way, an influence of online or offline of a single node on a forwarding process of the service data can be reduced, and fault tolerance is strong, so that the service data can be quickly transmitted to a corresponding data pool.

BRIEF DESCRIPTION OF THE DRAWINGS

To describe the technical solutions of the embodiments of this application or the existing technology more clearly, the following briefly introduces the accompanying drawings required for describing the embodiments or the existing technology. Apparently, the accompanying drawings in the following description show only some embodiments recorded in this application, and a person of ordinary skill in the art still derives other drawings from these accompanying drawings without creative efforts.

DESCRIPTION OF EMBODIMENTS

The technical solutions in the embodiments of this application are clearly and completely described in the following with reference to the accompanying drawings in the embodiments of this application. Apparently, the described embodiments are merely some rather than all of the embodiments of this application. All other embodiments obtained by a person of ordinary skill in the art based on the embodiments of this application without making creative efforts shall fall within the protection scope of this application.

In an existing blockchain network, there are the following problems in a forwarding process of service data. If a node goes online or offline, it is likely to affect transaction forwarding, fault tolerance is poor, and it cannot ensure that the service data is quickly and effectively transmitted to a corresponding data pool. As a response, an embodiment of this application provides a data routing method, which can ensure that a forwarding process of service data cannot be affected by online or offline of a single node, and fault tolerance is strong, so that the service data can be quickly transmitted to a corresponding data pool.

Figure 1A:
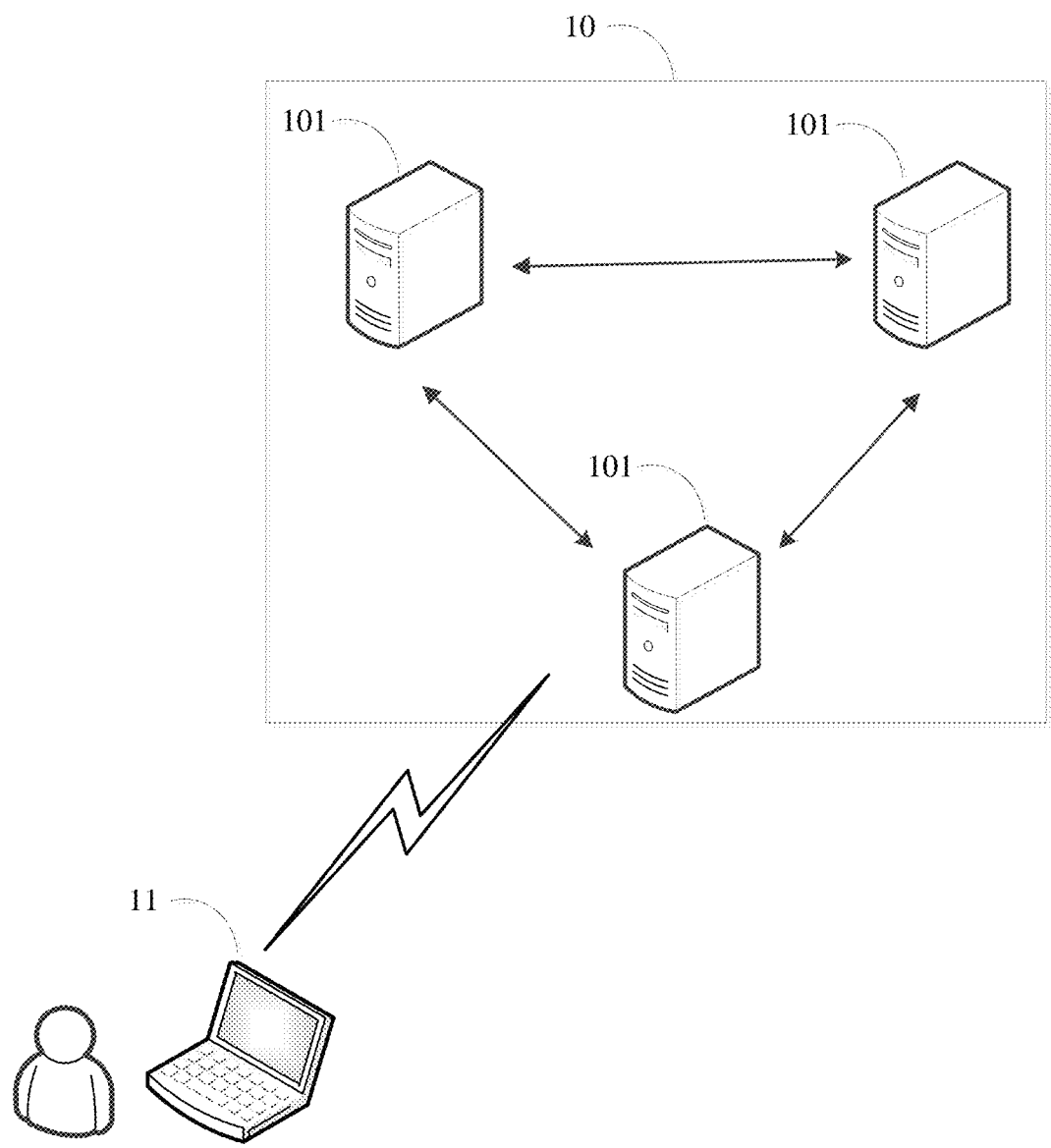
FIG. 1a is a schematic architectural diagram of a data routing system according to an embodiment of this application.

FIG. 1a is a schematic architectural diagram of a data routing system according to an embodiment of this application. The transaction routing system includes a blockchain network 10 and a terminal device 11.

The blockchain network 10 is a network for data sharing between nodes, and the blockchain network may include a plurality of nodes 101. Each node 101 may receive inputted information (for example, service data) during normal operating, and maintain shared data (that is, a blockchain) in the blockchain network based on the received inputted information. To ensure information exchange in the blockchain network, information connections may exist among all the nodes, and Peer to Peer (P2P) communication may be performed between any two nodes, and may be performed through a wired communication link or a wireless communication link. For example, when any node in the blockchain network receives inputted information, other nodes obtain the inputted information according to a consensus algorithm, and store the inputted information as shared data, so that data stored in all nodes in the blockchain network is consistent.

The terminal device 11 may access the blockchain network, and may communicate with the nodes in the blockchain network, for example, submit service data to nodes, and query data from the nodes. The terminal device 11 may be a smartphone, a tablet computer, a notebook computer, a desktop computer, an in-vehicle smart terminal, or the like. These are just a few examples and the embodiments may include more than the examples described here.

A quantity of nodes shown in FIG. 1a is merely used as an example. Any quantity of nodes may be deployed according to actual needs.

Each node in the blockchain network has a corresponding node identifier, and each node in the blockchain network may store node identifiers of other nodes in the blockchain network, to subsequently broadcast a generated block to other nodes in the blockchain network according to the node identifiers of other nodes. Each node may maintain a node identifier list shown in the following table, and store node names and node identifiers correspondingly in the node identifier list. The node identifier may be an Internet Protocol (IP) address or any other information that can be used to identify the node. Only an IP address is used for description in this table.

| Node name | Node identifier |
|---|---|
| Node 1 | 117.114.151.174 |
| Node 2 | 117.116.189.145 |
| ... | ... |
| Node N | 119.123.254.12 |

Figure 1B:
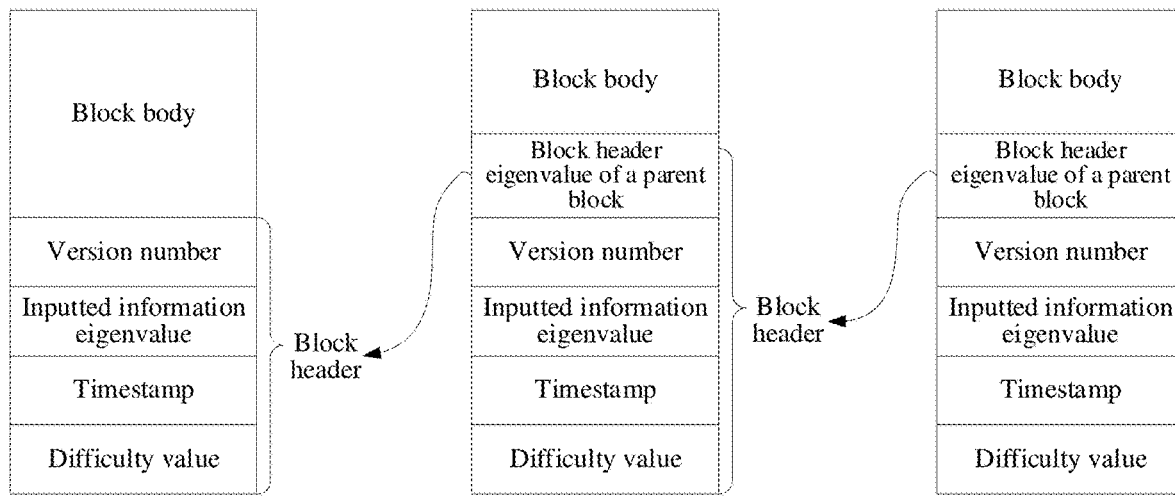
FIG. 1b is a schematic structural diagram of a blockchain according to an embodiment of this application.

Each node in the blockchain network stores the same blockchain. Referring to FIG. 1b, the blockchain includes a plurality of blocks, and a genesis block is a first block (for example, a left-side block shown in FIG. 1b) in the plurality of blocks and includes a block header and a block body. The block header stores an inputted information eigenvalue, a version number, a timestamp, and a difficulty value, and the block body stores the inputted information. A next block (for example, a middle block shown in FIG. 1b) of the genesis block uses the genesis block as a parent block, and the block also includes a block header and a block body. The block header stores the inputted information eigenvalue of the current block, a block header eigenvalue of the parent block, a version number, a timestamp, and a difficulty value, and the rest is deduced by analogy, so that block data stored in each block in the blockchain is associated with block data stored in the parent block, ensuring the security of the inputted information in the blocks.

Figure 1C:
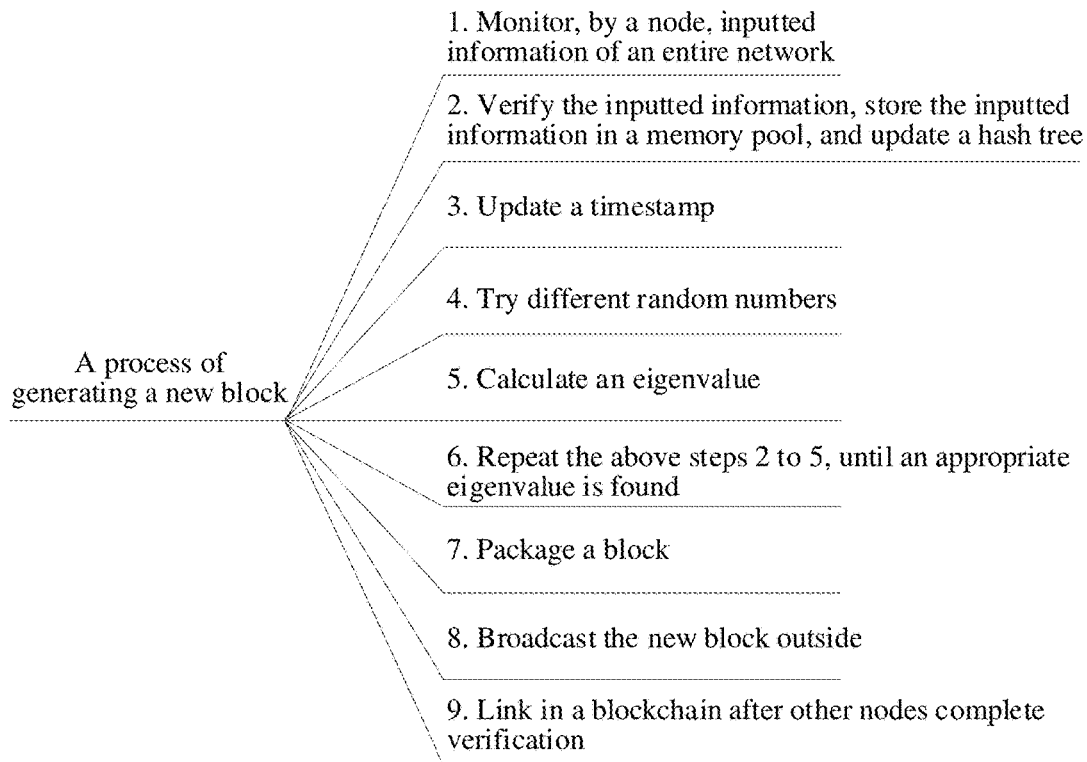
FIG. 1c is a schematic diagram of a process of generating a new blockchain according to an embodiment of this application.

When blocks are generated in the blockchain, referring to FIG. 1c, when a node in which the blockchain is located receives the inputted information, the inputted information is verified. After the verification is completed, the inputted information is stored in a memory pool, and a hash tree thereof used for recording the inputted information is updated. Next, the timestamp is updated to the time when the inputted information is received, different random numbers are tried, and eigenvalue calculation is performed a plurality of times, so that the calculated eigenvalue may satisfy the following formula:

$$SHA256(SHA256(version+prev\_hash+merkle\_root+ntime+nbits+x))<TARGET$$

where, SHA256 is an eigenvalue algorithm used for calculating an eigenvalue; version (a version number) is version information of a related block protocol in the blockchain; prev_hash is the block header eigenvalue of the parent block of the current block; merkle_root is the inputted information eigenvalue; ntime is the update time of updating the timestamp; nbits is current difficulty, is a fixed value within a period of time, and is redetermined after the fixed period of time; x is a random number; and TARGET is an eigenvalue threshold, and the eigenvalue threshold may be determined and obtained according to nbits.

In this way, when a random number satisfying the above formula is obtained through calculation, information may be correspondingly stored, and a block header and a block body are generated, to obtain the current block. Subsequently, the node in which the blockchain is located transmits, according to the node identifiers of other nodes in the blockchain network, a newly generated block to the other nodes in the blockchain network in which the node is located, and the other nodes verify the newly generated block and add the newly generated block after the verification to the blockchain stored in the other nodes.

The nodes in the blockchain network may operate a smart contract, and the smart contract is implemented by using code that is executed when a certain condition is satisfied. A developer may define contract logic by using a programming language, and release the contract logic onto a blockchain (smart contract registration). According to the logic of contract items, a key or another event is invoked to trigger execution, to complete the contract logic. Functions of smart contract upgrade and cancellation are further provided.

In some feasible implementations, a specific node 101 (which may be a consensus node) in the blockchain network determines, when service data is received, a target data pool corresponding to the service data; the consensus node obtains an address of a second data pool from a plurality of routing and forwarding tables according to a shortest prefix of the target data pool, where the plurality of routing and forwarding tables correspond to a plurality of subtrees of a trie tree, the trie tree includes a plurality of leaf nodes, the leaf nodes correspond to data pools of consensus nodes one by one, a leaf node corresponding to the second data pool and a leaf node corresponding to the target data pool are in a same subtree, the plurality of subtrees are obtained by splitting the trie tree from a root node by using a first leaf node corresponding to a data pool of a first consensus node as a benchmark, the routing and forwarding tables are configured to record addresses of data pools represented by a preset quantity of leaf nodes in the corresponding subtrees, and the first consensus node is any one of the plurality of consensus nodes; and the consensus node transmits the service data to a consensus node corresponding to the address of the second data pool. In this way, a node in which each data pool is located can effectively manage a state of a local part of the entire network. Because the routing and forwarding tables record the addresses of the data pools represented by the preset quantity of leaf nodes, effective consensus nodes may be determined based on the routing and forwarding tables when a consensus node goes offline in a forwarding process, to complete forwarding. In this way, an influence of online or offline of a single node on a forwarding process of the service data can be reduced, and fault tolerance is strong, so that the service data can be quickly transmitted to a corresponding data pool.

In the embodiments of this application, service data may be related data implementing various service functions, for example, when a transaction function needs to be implemented, the service data may be transaction data. Different types of service data may be quickly forwarded by using the data routing method provided in the embodiments of this application.

When the service data is forwarded to a consensus node, the consensus node may cache through a data pool maintained by itself. Different types of service data may be cached through a same data pool, or be respectively cached in different data pools. The transaction data belongs to one of the service data. For the transaction data, the consensus node may cache the transaction data through a dedicated data pool: a transaction pool.

For ease of description, in subsequent embodiments, the transaction data being used as the service data and the transaction pool being used as the data pool are examples.

The implementation details of the technical solution of this embodiment of this application are described in detail in the following.

Figure 2:
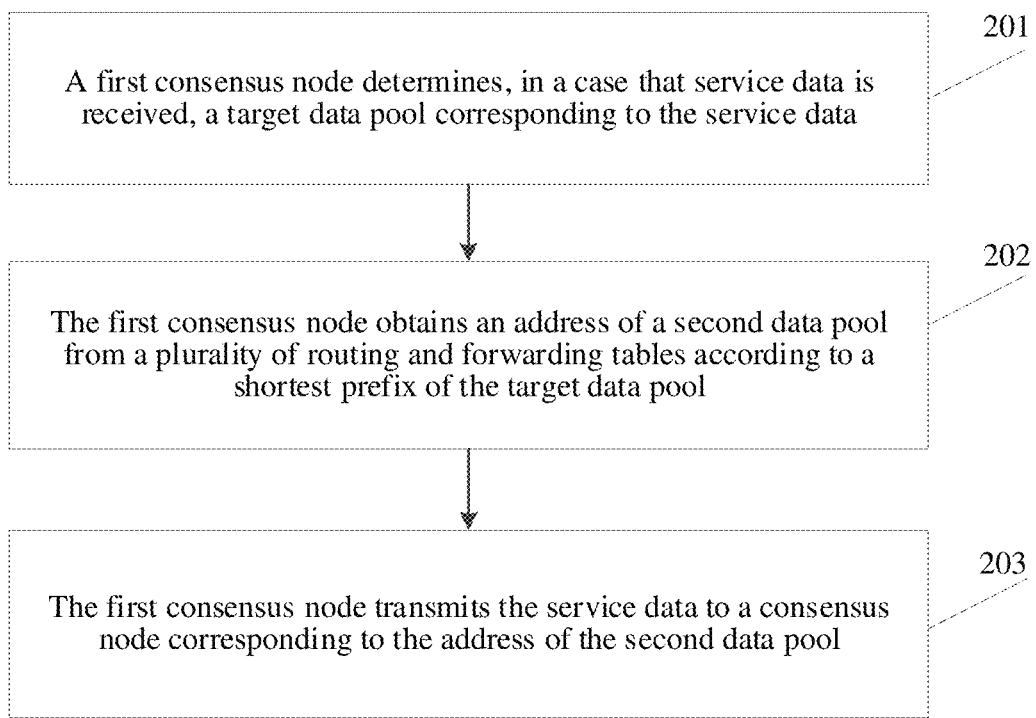
FIG. 2 is a schematic flowchart of a data routing method according to an embodiment of this application.

FIG. 2 is a schematic flowchart of a data routing method based on the data routing system shown in FIG. 1a according to an embodiment of this application. The data routing method of this embodiment of this application is mainly described from the perspective of a consensus node, a blockchain network includes a plurality of consensus nodes, and the data routing method includes the following steps.

201. Determine, by a first consensus node when service data is received, a target data pool corresponding to the service data.

The first consensus node is any one of the plurality of consensus nodes.

Each consensus node in the blockchain network may maintain a temporary list of unconfirmed transactions, which is referred to as a memory pool or transaction pool. The transaction pool is stored in a local memory, not in a permanent storage device (for example, a hard disk). The transaction pool is dynamically filled with the transaction data incoming from the blockchain network. When the consensus node is enabled, the corresponding transaction pool is idle. As new transaction data in the blockchain network is continuously received, the transaction pool is gradually filled.

In one example, when transaction data submitted by a terminal device or transaction data forwarded by other consensus nodes is received, the first consensus node determines a transaction pool (which is recorded as a target transaction pool) that needs to cache the transaction data.

In some feasible implementations, there may be a plurality of target transaction pools, which means that the transaction data needs to be finally transmitted to the plurality of consensus nodes respectively corresponding to the plurality of target transaction pools.

In some feasible implementations, the transaction data may alternatively be data generated by the first consensus node itself.

In some feasible implementations, the transaction data may carry an identifier of the transaction pool, and the first consensus node may determine the target transaction pool that needs to cache the transaction data according to the identifier of the transaction pool.

In some feasible implementations, the first consensus node may query the target transaction pool that needs to cache the transaction data from a trie tree according to a hash value of the transaction data, where the trie tree includes a plurality of leaf nodes, and each leaf node correspondingly represents a transaction pool of a consensus node respectively.

202. Obtain, by the first consensus node, an address of a second data pool from a plurality of routing and forwarding tables according to a shortest prefix of the target data pool.

The plurality of routing and forwarding tables correspond to a plurality of subtrees of the trie tree, and the plurality of subtrees are obtained by splitting the trie tree from a root node by using a first leaf node corresponding to a transaction pool of the first consensus node as a benchmark. A consensus node in which each transaction pool is located may maintain a state of a local consensus node in the blockchain network by maintaining a corresponding routing and forwarding table, and the routing and forwarding tables are configured to record addresses of transaction pools represented by a preset quantity of leaf nodes in the corresponding subtrees.

The preset quantity may be generally set to be relatively small, so that an amount of data in a routing and forwarding table that a consensus node needs to maintain may not be too great. In a possible implementation, the preset quantity may be greater than or equal to 2, that is, any consensus node may know addresses of transaction pools correspondingly represented by at least two leaf nodes in each subtree, and the addresses are configured to forward the transaction data. In this case, because a routing and forwarding table includes addresses of a plurality of transaction pools, other alternative consensus nodes may complete forwarding of the transaction data when a specific consensus node that needs to be configured to forward goes offline.

In one example, after the first consensus node determines the target transaction pool, if the transaction pool maintained by the first consensus node itself is not the target transaction pool, the first consensus node may obtain a shortest prefix of the target transaction pool, and obtain an address of a second transaction pool from the plurality of routing and forwarding tables according to the shortest prefix of the target transaction pool. A leaf node corresponding to the second transaction pool is located in a subtree which includes a leaf node corresponding to the target transaction pool in the plurality of subtrees, or the leaf node corresponding to the second transaction pool and the leaf node corresponding to the target transaction pool are in a same subtree, that is, an address of a transaction pool (which is recorded as the second transaction pool) corresponding to a leaf node closer to the leaf node corresponding to the target transaction pool in the trie tree needs to be queried.

The address of the data pool may be an IP address, a port number, or the like.

Figure 4:
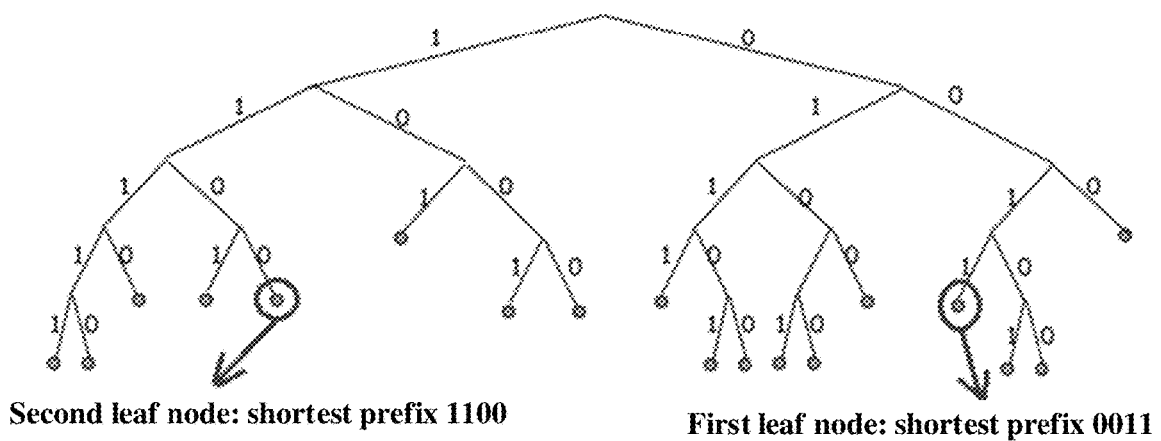
FIG. 4 is a schematic structural diagram of a trie tree according to an embodiment of this application.

In some feasible implementations, a structure of the trie tree may be shown in FIG. 4, the trie tree is established according to shortest prefixes of transaction pools of consensus nodes, the trie tree includes a plurality of leaf nodes, and each leaf node in the trie tree correspondingly represents a transaction pool of a consensus node. For example, a shortest prefix of the transaction pool correspondingly represented by the first leaf node is 0011, that is, a result obtained in a manner that 0 and 1 on a path from a root node to the first leaf node are arranged in order. A shortest prefix of the transaction pool correspondingly represented by a second leaf node is 1100, that is, a result obtained in a manner that 0 and 1 on a path from a root node to the second leaf node are arranged in order.

In some feasible implementations, the first consensus node may perform hash operation on identifiers of the consensus nodes, to obtain a hash value corresponding to a data pool of each consensus node. The hash operation may be, for example, sha1 hash operation, and the obtained hash value is 160-bit data. Then, by comparing a hash value corresponding to a transaction pool of each consensus node, a shortest prefix of the transaction pool of each consensus node may be determined.

In some feasible implementations, if the transaction pool maintained by the first consensus node itself is the target transaction pool, the first consensus node is a target node of current transaction data forwarding, that is, the current transaction data forwarding is completed, and the first consensus node may cache the transaction data in the transaction pool maintained by the first consensus node itself.

203. Transmit, by the first consensus node, the service data to a consensus node corresponding to the address of the second data pool.

In one example, the first consensus node transmits the transaction data to a consensus node corresponding to the address of the second transaction pool. The consensus node corresponding to the address of the second transaction pool continuously transmits the transaction data when the transaction pool maintained by the consensus node itself is not the target transaction pool, so that the transaction data is finally transmitted to a consensus node that maintains the target transaction pool. Because the preset quantity is greater than or equal to 2 and each forwarding process may be executed by participation of consensus nodes of transaction pools correspondingly represented by at least two leaf nodes, the forwarding process of the transaction data cannot be affected by online or offline of a single node, which can ensure that the transaction data is quickly and effectively transmitted to a corresponding transaction pool.

In the embodiments of this application, a consensus node determines, when transaction data is received, a target data pool corresponding to the transaction data; the consensus node obtains an address of a second transaction pool from a plurality of routing and forwarding tables according to a shortest prefix of the target transaction pool, where the plurality of routing and forwarding tables correspond to a plurality of subtrees of a trie tree, the trie tree includes a plurality of leaf nodes, the leaf nodes correspond to transaction pools of consensus nodes one by one, a leaf node corresponding to the second transaction pool and a leaf node corresponding to the target transaction pool are in a same subtree, the plurality of subtrees are obtained by splitting the trie tree from a root node by using a first leaf node corresponding to a transaction pool of a first consensus node as a benchmark, and the routing and forwarding tables are configured to record addresses of transaction pools represented by a preset quantity of leaf nodes in the corresponding subtrees; and the consensus node transmits the transaction data to a consensus node corresponding to the address of the second transaction pool. In this way, a consensus node in which each transaction pool is located can effectively manage a state of a local node in a blockchain network. Because the routing and forwarding tables record the addresses of the transaction pools represented by the preset quantity of leaf nodes, effective consensus nodes may be determined based on the routing and forwarding tables when a consensus node goes offline in a forwarding process, to complete forwarding. In this way, an influence of online or offline of a single node on a forwarding process of the transaction data can be reduced, and fault tolerance is strong, so that the transaction data can be quickly transmitted to a corresponding transaction pool.

Figure 3:
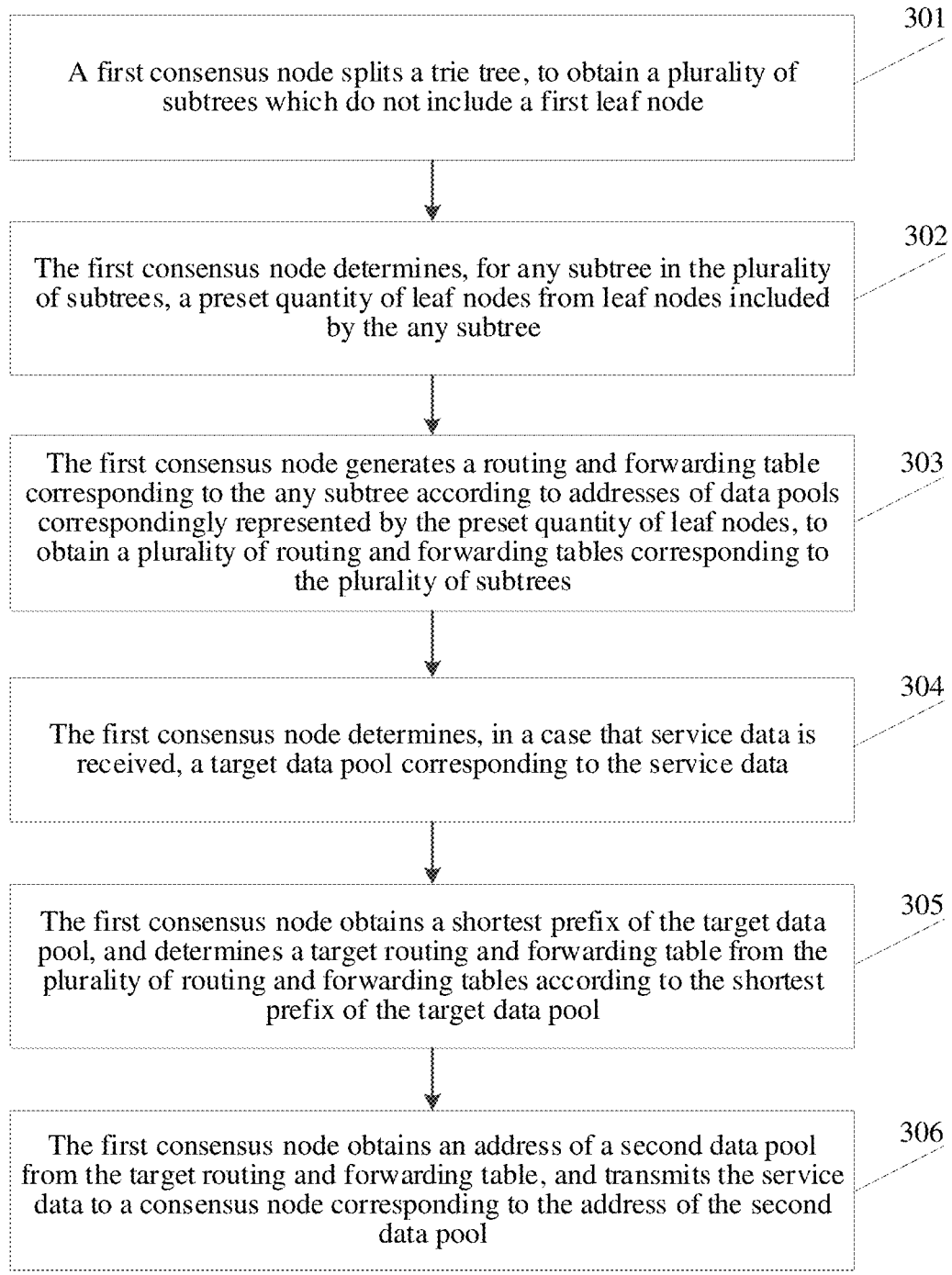
FIG. 3 is a schematic flowchart of another data routing method according to an embodiment of this application.

FIG. 3 is a schematic flowchart of another transaction routing method based on the transaction routing system shown in FIG. 1a according to an embodiment of this application. The transaction routing method of this embodiment of this application is mainly described from the perspective of a consensus node, a blockchain network includes a plurality of consensus nodes, and the transaction routing method includes the following steps.

301. Split, by a first consensus node, a trie tree, to obtain a plurality of subtrees which do not include a first leaf node.

The first leaf node correspondingly represents a data pool of the first consensus node in the trie tree, and the first consensus node is any one of the plurality of consensus nodes.

In one example, the first consensus node may split the trie tree from a root node by using the first leaf node as a benchmark, to obtain a first subtree and a second subtree, and the second subtree includes the first leaf node. That is, the trie tree is first split into two parts (that is, the first subtree and the second subtree), and leaf nodes corresponding to a transaction pool of the first consensus node are in the second subtree. Then, the first consensus node splits the second subtree by using the first leaf node as a benchmark, to obtain a plurality of third subtrees, and determines whether to continuously split the third subtrees. If a third subtree which includes the first leaf node does not exist in the plurality of third subtrees, it means that the trie tree has been split to the first leaf node, and the first leaf node corresponds to one subtree alone. In this case, the split may be stopped, and the first subtree and the plurality of third subtrees are used as the plurality of subtrees obtained by splitting the trie tree. If the third subtree which includes the first leaf node exists in the plurality of third subtrees, it means that the trie tree has not been split to the first leaf node, and the first leaf node does not correspond to one subtree alone. Therefore, the split needs to be continued, and the third subtree which includes the first leaf node is split, to obtain a fourth subtree which does not include the first leaf node. In this case, the first subtree, third subtrees which do not include the first leaf node in the plurality of third subtrees, and the fourth subtree are used as the plurality of subtrees obtained by splitting the trie tree. In some embodiments, the first consensus node may split the trie tree layer by layer from the root node by using the first leaf node as a benchmark, split a subtree which includes the first leaf node in each layer of subtrees in the trie tree, and stop splitting until the trie tree is split to the first leaf node. In the splitting process, a plurality of subtrees which do not include the first leaf node are obtained, and routing and forwarding tables corresponding to the plurality of subtrees are established. In these embodiments, the quantity of the plurality of subtrees may be varied and there may be more than the examples described here.

Figure 5:
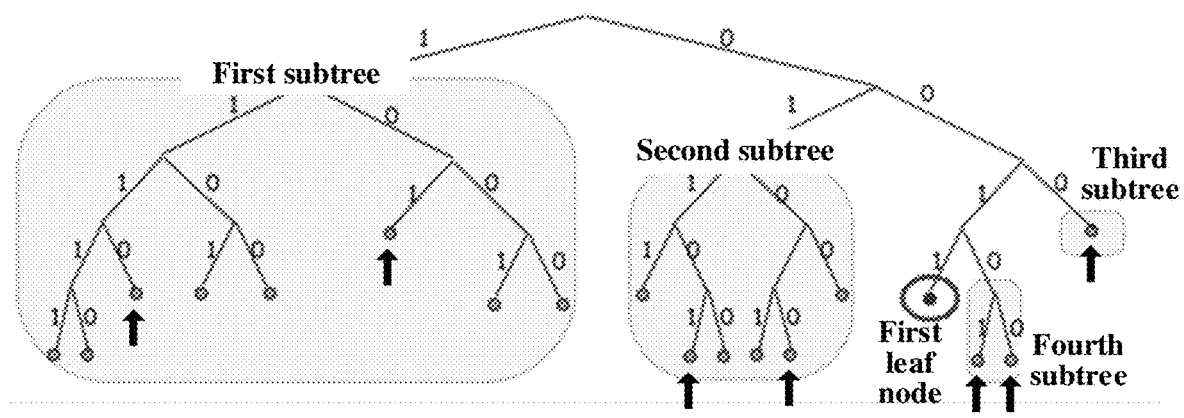
FIG. 5 is a schematic diagram of splitting a trie tree according to an embodiment of this application.

For example, a splitting rule of the trie tree is: splitting, from the root node of the trie tree, a subtree which does not include itself by using a data pool corresponding to itself (a leaf node) as a perspective (that is, the benchmark); splitting next layer of subtrees which do not include itself in the remaining subtrees; and deducing by analogy, until the end is only itself. As shown in FIG. 5, FIG. 5 is a result of splitting the trie tree obtained by using the perspective of the first leaf node as an example, and a shortest prefix of the first leaf node is 0011. First, split a subtree which does not include the first leaf node itself from the root node, that is, a branch in which a first place of a shortest prefix in the trie tree is 1, namely, a first subtree. Then, split a branch in which a first-two place of a shortest prefix in the trie tree is 01, namely, a second subtree. By analogy, finally, split the trie tree into the first subtree, the second subtree, a third subtree, and a fourth subtree that do not include the first leaf node itself.

302. For any subtree in the plurality of subtrees, determine, by the first consensus node, a preset quantity of leaf nodes from leaf nodes included by the any subtree.

303. Generate, by the first consensus node, a routing and forwarding table corresponding to the any subtree according to the addresses of the data pools correspondingly represented by the preset quantity of leaf nodes, to obtain a plurality of routing and forwarding tables corresponding to the plurality of subtrees.

In one example, after completing the subtree split from the perspective of a leaf node corresponding to the first consensus node, the first consensus node may determine a preset quantity of leaf nodes from each subtree, and record addresses of transaction pools correspondingly represented by the preset quantity of leaf nodes in each subtree. For a specific leaf node, if n subtrees are obtained by splitting from the perspective of the leaf node itself, the leaf node needs to maintain n routing tables.

In some feasible implementations, for each subtree, the first consensus node may obtain online states (online or offline) of consensus nodes in which transaction pools correspondingly represented by leaf nodes in the each subtree are located, and determine currently online consensus nodes according to the online states and use leaf nodes corresponding to the currently online consensus nodes as the preset quantity of leaf nodes, or select the preset quantity of leaf nodes from the leaf nodes corresponding to the currently online consensus nodes, to ensure smooth progress of transaction data forwarding.

Further, the first consensus node may further obtain periodically the online states of the consensus nodes in which the transaction pools correspondingly represented by the leaf nodes in the each subtree are located, and dynamically update the preset quantity of leaf nodes, to ensure that consensus nodes participating in the transaction data forwarding are all online, thereby helping rapid progress of the transaction data forwarding.

By using an example in which the preset quantity=2, that is, after subtree split is completed on each leaf node, addresses of transaction pools correspondingly represented by two leaf nodes in each subtree need to be recorded, to obtain a routing relationship shown in FIG. 5: each routing table records addresses of transaction pools correspondingly represented by two leaf nodes indicated by black arrows in a subtree; and certainly, if a subtree only includes one leaf node, a corresponding routing table only records an address of a transaction pool correspondingly represented by the leaf node. It can be learned that, the first leaf node (which corresponds to the first consensus node) needs to maintain four routing tables, where a routing table corresponding to the first subtree records addresses of transaction pools correspondingly represented by two leaf nodes 1110 and 101 in the trie tree, a routing table corresponding to the second subtree records addresses of transaction pools correspondingly represented by two leaf nodes 01101 and 01010 in the trie tree, a routing table corresponding to the third subtree records an address of a transaction pool correspondingly represented by one leaf node 000 in the trie tree, and a routing table corresponding to the fourth subtree records addresses of transaction pools correspondingly represented by two leaf nodes 00100 and 00101 in the trie tree.

304. Determine, by the first consensus node when service data is received, a target data pool corresponding to the service data.

In one example, when the transaction data is received, the first consensus node may obtain a hash value of the service data by using a sha1 hash algorithm, query a second leaf node corresponding to the hash value from the trie tree, and then use a data pool correspondingly represented by the second leaf node as a target transaction pool, where the second leaf node includes at least one leaf node.

In some feasible implementations, the first consensus node may obtain a prefix of a hash value of the transaction data, query, from the root node of the trie tree, subtrees of the trie tree one by one according to the prefix of the hash value, until a quantity of leaf nodes included by the first subtree is less than or equal to a preset quantity threshold, and then use the leaf nodes included by the first subtree as the second leaf node corresponding to the hash value.

In one example, the prefix of the hash value may be a binary sequence. The first consensus node queries, from the root node of the trie tree, the subtrees one by one from corresponding subtree branches according to an arrangement order of 0 and 1 in the binary sequence, until the quantity of leaf nodes included by the first subtree is less than or equal to the preset quantity threshold, and then uses the leaf nodes included by the first subtree as the second leaf node corresponding to the hash value.

For example, with reference to FIG. 4, if the hash value of the transaction data is 100 . . . and the preset quantity threshold is 2, the first consensus node may query the trie tree according to an order of 1, 0, and 0: queries, from the root node, a subtree corresponding to 1 in which eight leaf nodes are included, continuously queries a subtree corresponding to 10 in which three leaf nodes (101, 1000, and 1001) are included, and continuously queries 100 in the trie tree. A subtree corresponding to 100 includes two leaf nodes, which means that a matching subtree (namely, the first subtree) is queried, that is, the query may be stopped, and the matching subtree includes two leaf nodes 1000 and 1001, so that two transaction pools correspondingly maintained by the two leaf nodes 1000 and 1001 may be used as the target transaction pool of the transaction data.

305. Obtain, by the first consensus node, a shortest prefix of the target data pool, and determine a target routing and forwarding table from the plurality of routing and forwarding tables according to the shortest prefix of the target data pool.

306. Obtain, by the first consensus node, an address of a second data pool from the target routing and forwarding table, and transmit the service data to a consensus node corresponding to the address of the second data pool.

In one example, the first consensus node may obtain a shortest prefix of the target transaction pool, determine the target routing and forwarding table from the plurality of routing and forwarding tables according to the shortest prefix of the target transaction pool, and then obtain an address of a second transaction pool from the target routing and forwarding table.

In a possible implementation, the target routing and forwarding table includes addresses of a plurality of second data pools. Target consensus nodes corresponding to the address of each second data pool in the addresses of the plurality of second data pools are determined, and the service data is transmitted to the target consensus nodes. When data pools maintained by the target consensus nodes themselves are not the target data pool, the service data is continuously transmitted, so that the service data is finally transmitted to a consensus node maintaining the target data pool.

For example, with reference to FIG. 5, if a transaction pool corresponding to the first consensus node (which corresponds to the first leaf node in FIG. 5) receives transaction data, and a shortest prefix of a target transaction pool corresponding to the transaction data is determined as 1001, the transaction pool corresponding to the first consensus node queries the plurality of maintained routing and forwarding tables (namely, the above four routing tables), determines the routing table corresponding to the first subtree (namely, a target routing table) according to the shortest prefix 1001 of the target transaction pool, queries the addresses of the transaction pools correspondingly represented by the two leaf nodes 1110 and 101 in the trie tree that are recorded by the routing table corresponding to the first subtree, and respectively forwards the transaction data to consensus nodes corresponding to the addresses of the two transaction pools according to the addresses. Then, the consensus node corresponding to the leaf node 101 queries a routing table (which includes 1001 and 1000) maintained by itself, and finally forwards the transaction data to a consensus node maintaining the transaction pool correspondingly represented by the shortest prefix 1001.

In some feasible implementations, if detecting that a specific consensus node in the routing and forwarding tables goes offline, the first consensus node may query a subtree in which a leaf node corresponding to the offline consensus node is located, select a consensus node correspondingly represented by an online leaf node from the subtree to replace the offline consensus node, and update the addresses of the transaction pools in the routing tables. In this way, if a specific node goes offline, the first consensus node may timely detect and update the routing and forwarding tables, thereby ensuring that a forwarding process of transaction data cannot be affected by online or offline of a single node.

In the embodiments of this application, a consensus node may split a trie tree, to obtain a plurality of subtrees which do not include leaf nodes corresponding to the consensus node itself. For any subtree in the plurality of subtrees, a first consensus node determines a preset quantity of leaf nodes from the any subtree, and generates a routing and forwarding table corresponding to the any subtree according to addresses of data pools correspondingly represented by the preset quantity of leaf nodes, to obtain a plurality of routing and forwarding tables corresponding to the plurality of subtrees. When service data is received, the first consensus node determines a target data pool corresponding to the service data, obtains the plurality of routing and forwarding tables corresponding to the plurality of subtrees of the trie tree, and may determine a target routing and forwarding table from the plurality of routing and forwarding tables according to a shortest prefix of the target data pool, to obtain an address of a second data pool from the target routing and forwarding table, and forward the service data to a consensus node corresponding to the address of the second data pool. The trie tree is split to generate the plurality of routing and forwarding tables, so that a consensus node in which each data pool is located can effectively manage a state of a local part (that is, data pools correspondingly represented by at least two leaf nodes in the subtrees) of an entire network, so that a forwarding process of the service data cannot be affected by online or offline of a single node, and fault tolerance is strong, so that the service data can be quickly transmitted to a corresponding data pool.

Figure 6:
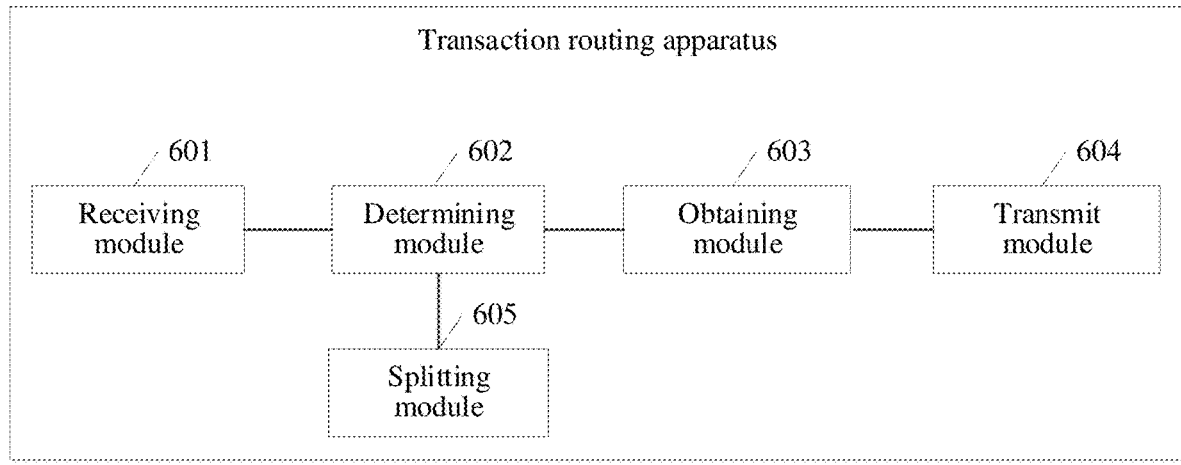
FIG. 6 is a schematic structural diagram of a data routing apparatus according to an embodiment of this application.

FIG. 6 is a schematic structural diagram of a data routing apparatus according to an embodiment of this application. The data routing apparatus of this embodiment of this application is applicable to a first consensus node in a blockchain network, the blockchain network includes a plurality of consensus nodes, the first consensus node is any one of the plurality of consensus nodes, each consensus node in the plurality of consensus nodes maintains a respectively corresponding data pool, and the apparatus includes:

a receiving module 601, configured to receive service data;

a determining module 602, configured to determine a target data pool corresponding to the service data when the receiving module receives the service data;

an obtaining module 603, configured to obtain an address of a second data pool from a plurality of routing and forwarding tables according to a shortest prefix of the target data pool, where the plurality of routing and forwarding tables correspond to a plurality of subtrees of a trie tree, the trie tree includes a plurality of leaf nodes, the leaf nodes correspond to the data pools of the consensus nodes one by one, a leaf node corresponding to the second data pool and a leaf node corresponding to the target data pool are in a same subtree, the plurality of subtrees are obtained by splitting the trie tree from a root node by using a first leaf node corresponding to a data pool of a first consensus node as a benchmark, the routing and forwarding tables are configured to record addresses of data pools represented by a preset quantity of leaf nodes in the corresponding subtrees, and the first consensus node is any one of the plurality of consensus nodes; and a transmit module 604, configured to transmit the service data to a consensus node corresponding to the address of the second data pool.

In some embodiments, the obtaining module 603 is configured to:
obtain the shortest prefix of the target data pool;
determine a target routing and forwarding table from the plurality of routing and forwarding tables according to the shortest prefix of the target data pool; and
obtain the address of the second data pool from the target routing and forwarding table.

In some embodiments, the target routing and forwarding table includes addresses of a plurality of second data pools, and the transmit module 604 is configured to:
determine target consensus nodes respectively corresponding to the addresses of the plurality of second data pools; and
transmit the service data to the target consensus nodes.

In some embodiments, the apparatus further includes a splitting module 605,
configured to split the trie tree, to obtain a plurality of subtrees which do not include the first leaf node.

The determining module 602 is further configured to determine, for any subtree in the plurality of subtrees, a preset quantity of leaf nodes from leaf nodes included by the any subtree.

The obtaining module 603 is further configured to generate a routing and forwarding table corresponding to the any subtree according to the addresses of the data pools correspondingly represented by the preset quantity of leaf nodes.

In some embodiments, the splitting module 605 is configured to:
split the trie tree layer by layer from the root node of the trie tree by using the first leaf node as a benchmark;
determine whether each layer of subtrees obtained in a splitting process includes the first leaf node, continuously splitting subtrees which include the first leaf node, and stopping splitting until the trie tree is split to the first leaf node; and
obtain the plurality of subtrees which do not include the first leaf node during stopping splitting.

In some embodiments, the determining module 602 is configured to:
obtain, when the service data is received, a hash value of the service data; and
query a second leaf node corresponding to the hash value from the trie tree, and use a service pool correspondingly represented by the second leaf node as a target service pool, where the second leaf node includes at least one leaf node.

In some embodiments, the addresses include one or two of an IP address and a port number.

In some embodiments, the preset quantity is greater than or equal to 2.

In some embodiments, the plurality of subtrees do not include the first leaf node.

Functions of functional modules of a service routing apparatus in this embodiment of this application may be implemented according to the method in the foregoing embodiments. References may be made between different embodiments. The term module (and other similar terms such as unit, submodule, etc.) may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module. A module is configured to perform functions and achieve goals such as those described in this disclosure, and may work together with other related modules, programs, and components to achieve those functions and goals.

Figure 7:
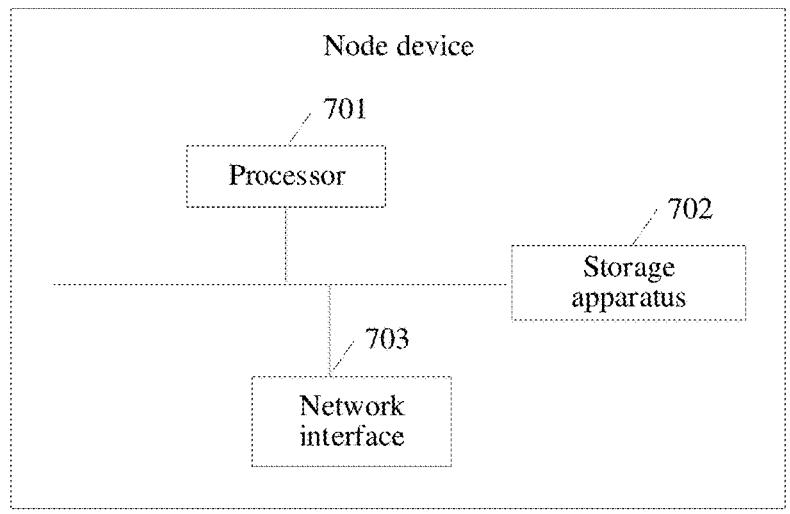
FIG. 7 is a schematic structural diagram of a node device according to an embodiment of this application.

FIG. 7 is a schematic structural diagram of a node device according to an embodiment of this application. The node device of this embodiment of this application includes a power supply module and other structures, and includes a processor 701, a storage apparatus 702, and a network interface 703. The processor 701, the storage apparatus 702, and the network interface 703 may exchange data.

The storage apparatus 702 may include a volatile memory such as a random-access memory (RAM); the storage apparatus 702 may also include a non-volatile memory such as a flash memory, or a solid-state drive (SSD); and the storage apparatus 702 may alternatively include a combination of the foregoing types of memories.

The processor 701 may be a central processing unit (CPU) 701. In an embodiment, the processor 701 may alternatively be a graphics processing unit (GPU) 701. The processor 701 may alternatively be a combination of a CPU and a GPU. In an embodiment, the storage apparatus 702 is configured to store program instructions. The processor 701 may invoke the program instructions, to perform the following operations:

determine, when the network interface 703 receives service data, a target data pool corresponding to the service data;

obtain an address of a second data pool from a plurality of routing and forwarding tables according to a shortest prefix of the target data pool, where the plurality of routing and forwarding tables correspond to a plurality of subtrees of a trie tree, the trie tree includes a plurality of leaf nodes, the leaf nodes correspond to data pools of consensus nodes one by one, a leaf node corresponding to the second data pool and a leaf node corresponding to the target data pool are in a same subtree, the plurality of subtrees are obtained by splitting the trie tree from a root node by using a first leaf node corresponding to a data pool of a first consensus node as a benchmark, the routing and forwarding tables are configured to record addresses of data pools represented by a preset quantity of leaf nodes in the corresponding subtrees, and the first consensus node is any one of the plurality of consensus nodes; and transmit, through the network interface 703, the service data to a consensus node corresponding to the address of the second data pool.

In some embodiments, the processor 701 is configured to:
obtain the shortest prefix of the target data pool;
determine a target routing and forwarding table from the plurality of routing and forwarding tables according to the shortest prefix of the target data pool; and
obtain the address of the second data pool from the target routing and forwarding table.

In some embodiments, the target routing and forwarding table includes addresses of a plurality of second data pools, and the processor 701 is configured to:

determine target consensus nodes respectively corresponding to the addresses of the plurality of second data pools; and transmit the service data to the target consensus nodes.

In some embodiments, the processor 701 is further configured to split the trie tree, to obtain a plurality of subtrees which do not include the first leaf node.

The processor 701 is further configured to determine, for any subtree in the plurality of subtrees, a preset quantity of leaf nodes from leaf nodes included by the any subtree.

The processor 701 is further configured to generate a routing and forwarding table corresponding to the any subtree according to the addresses of the data pools correspondingly represented by the preset quantity of leaf nodes.

In some embodiments, the processor 701 is configured to:
split the trie tree layer by layer from the root node of the trie tree by using the first leaf node as a benchmark;
determine whether each layer of subtrees obtained in a splitting process includes the first leaf node, continuously splitting subtrees which include the first leaf node, and stopping splitting until the trie tree is split to the first leaf node; and
obtain the plurality of subtrees which do not include the first leaf node during stopping splitting.

In some embodiments, the processor 701 is configured to:
obtain, in the case that the service data is received, a hash value of the service data; and
query a second leaf node corresponding to the hash value from the trie tree, and use a data pool correspondingly represented by the second leaf node as the target data pool, where the second leaf node includes at least one leaf node.

In some embodiments, the addresses include one or two of an IP address and a port number.

In some embodiments, the preset quantity is greater than or equal to 2.

In some embodiments, the plurality of subtrees do not include the first leaf node.

During specific implementation, the processor 701, the storage apparatus 702, and the network interface 703 that are described in this embodiment of this application may perform the implementation described in related embodiments of a data routing method provided in FIG. 2 or FIG. 3 of the embodiments of this application, or may perform the implementation described in related embodiments of a data routing apparatus provided in FIG. 6 of the embodiments of this application.

In addition, the embodiments of this application further provide a storage medium, the storage medium being configured to store a computer program, the computer program being configured to perform the method in the foregoing embodiments.

An embodiment of this application further provides a computer program product including instructions, the instructions, when run on a computer, causing the computer to perform the method according to the foregoing embodiments.

In the foregoing embodiments, a description of each embodiment may focus on a different part, so the descriptions of those different embodiments may be relevant to other embodiments. Reference may be made to the related description of the other embodiments.

For brief description, the foregoing method embodiments are redisplayed as a series of action combinations. However, a person skilled in the art is to appreciate that this application is not limited to the described order of the actions, because according to this application, some steps may be performed in other orders or simultaneously. As described, the examples and embodiments are merely examples and there may be other examples and embodiments that are contemplated.

In the embodiments provided in this application, it should be understood that the disclosed apparatus may be implemented in another manner. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces; indirect couplings or communication connections between apparatuses or units may be electric or in other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application can be integrated into one processing unit, or each of the units can exist alone physically, or two or more units are integrated into one unit. The integrated unit may be implemented in a form of hardware, or may be implemented in a form of a software function unit.

When the integrated unit is implemented in the form of a software functional unit and sold or used as an independent product, the integrated unit may be stored in a non-transitory computer-readable storage medium. Based on such an understanding, the technical solutions of this application essentially, or the part contributing to the prior art, or all or a part of the technical solutions may be implemented in the form of a software product. The software product is stored in a storage medium and includes several instructions for instructing a computer device (which may be a personal computer, a server, or a network device, and may be a processor in a computer device) to perform all or a part of the steps of the foregoing methods described in the embodiments of this application. The foregoing storage medium includes: any medium that can store program code, such as a USB flash drive, a removable hard disk, a magnetic disk, an optical disc, a read-only memory (ROM), or a random access memory (RAM).

The foregoing embodiments are merely intended for describing the technical solutions of this application, but not for limiting this application. It should be understood by a person of ordinary skill in the art that although this application has been described in detail with reference to the foregoing embodiments, modifications can be made to the technical solutions described in the foregoing embodiments, or equivalent replacements can be made to some technical features in the technical solutions, without departing from the spirit and scope of the technical solutions of the embodiments of this application.

What is claimed is:

1. A data routing method comprising:
    determining, by a first consensus node and in response to service data being received, a target data pool corresponding to the service data, wherein the first consensus node is any one of a plurality of consensus nodes, wherein the plurality of consensus nodes maintaining respectively a corresponding data pools;
    obtaining, by the first consensus node, an address of a second data pool from a plurality of routing and forwarding tables according to a shortest prefix of the target data pool, the plurality of routing and forwarding tables corresponding to a plurality of subtrees of a trie tree and the trie tree comprising a plurality of leaf nodes corresponding to data pools of the consensus nodes, wherein a leaf node corresponding to the second data pool and a leaf node corresponding to the target data pool are in a same subtree, further wherein the plurality of subtrees is obtained by splitting the trie tree from a root node by using a first leaf node corresponding to a data pool of the first consensus node as a benchmark, and the routing and forwarding tables are configured to record addresses of data pools represented by a preset quantity of leaf nodes in the corresponding subtrees; and
    transmitting, by the first consensus node, the service data to one of the consensus nodes corresponding to the address of the second data pool.

2. The method according to claim 1, wherein the obtaining further comprises:
    obtaining, by the first consensus node, the shortest prefix of the target data pool;
    determining, by the first consensus node, a target routing and forwarding table from the plurality of routing and forwarding tables according to the shortest prefix of the target data pool; and
    obtaining, by the first consensus node, the address of the second data pool from the target routing and forwarding table.

3. The method according to claim 2, wherein the target routing and forwarding table comprises addresses of a plurality of second data pools, and the transmitting further comprises:
    determining, by the first consensus node, target consensus nodes respectively corresponding to the addresses of the plurality of second data pools; and
    transmitting, by the first consensus node, the service data to the target consensus nodes.

4. The method according to claim 1, wherein before the determining, the method comprises:
    splitting, by the first consensus node, the trie tree, to obtain a plurality of subtrees which do not comprise the first leaf node;
    for any subtree in the plurality of subtrees, determining, by the first consensus node, a preset quantity of leaf nodes from leaf nodes comprised by the any subtree; and
    generating, by the first consensus node, a routing and forwarding table corresponding to the any subtree according to the addresses of the data pools correspondingly represented by the preset quantity of leaf nodes.

5. The method according to claim 4, wherein the splitting further comprises:
    splitting, by the first consensus node, the trie tree layer by layer from the root node of the trie tree by using the first leaf node as a benchmark;
    determining, by the first consensus node, whether each layer of subtrees obtained in a splitting process comprises the first leaf node, splitting continuously subtrees which comprise the first leaf node, and stopping splitting until the trie tree is split to the first leaf node; and
    obtaining, by the first consensus node, the plurality of subtrees which do not comprise the first leaf node during stopping splitting.

6. The method according to claim 1, wherein the determining, by a first consensus node in response to service data being received, a target data pool corresponding to the service data comprises:
   obtaining, by the first consensus node in the case that the service data is received, a hash value of the service data; and
   querying, by the first consensus node, a second leaf node corresponding to the hash value from the trie tree, and using a data pool correspondingly represented by the second leaf node as the target data pool, wherein the second leaf node comprises at least one leaf node.

7. The method according to claim 1, wherein the addresses comprise at least one of an Internet Protocol (IP) address or a port number.

8. The method according to claim 1, wherein the preset quantity is greater than or equal to 2.

9. The method according to claim 1, wherein the plurality of subtrees do not comprise the first leaf node.

10. A computer device, comprising:
    a processor, a communication interface, a memory, and a communication bus,
    the processor, the communication interface, and the memory communicating with each other by using the communication bus; the communication interface being an interface of a communication module;
    the memory being configured to store program code and transmit the program code to the processor; and
    the processor being configured to invoke instructions of the program code in the memory to perform the data routing method according to claim 1.

11. The method according to claim 1, wherein the method is applicable to a blockchain network, the blockchain network comprising the plurality of consensus nodes.

12. A non-transitory computer-readable storage medium, the computer storage medium storing a computer program, the computer program comprising program instructions, the program instructions, when executed by a processor, being configured to perform a data routing method comprising:
    determining, by a first consensus node and in response to service data being received, a target data pool corresponding to the service data, wherein the first consensus node is any one of a plurality of consensus nodes, wherein the plurality of consensus nodes maintaining respectively a corresponding data pools;
    obtaining, by the first consensus node, an address of a second data pool from a plurality of routing and forwarding tables according to a shortest prefix of the target data pool, the plurality of routing and forwarding tables corresponding to a plurality of subtrees of a trie tree and the trie tree comprising a plurality of leaf nodes corresponding to data pools of the consensus nodes, wherein a leaf node corresponding to the second data pool and a leaf node corresponding to the target data pool are in a same subtree, further wherein the plurality of subtrees is obtained by splitting the trie tree from a root node by using a first leaf node corresponding to a data pool of the first consensus node as a benchmark, and the routing and forwarding tables are configured to record addresses of data pools represented by a preset quantity of leaf nodes in the corresponding subtrees; and
    transmitting, by the first consensus node, the service data to one of the consensus nodes corresponding to the address of the second data pool.

13. The computer-readable storage medium of claim 12, wherein the obtaining further comprises:
    obtaining, by the first consensus node, the shortest prefix of the target data pool;
    determining, by the first consensus node, a target routing and forwarding table from the plurality of routing and forwarding tables according to the shortest prefix of the target data pool; and
    obtaining, by the first consensus node, the address of the second data pool from the target routing and forwarding table.

14. The computer-readable storage medium of claim 13, wherein the target routing and forwarding table comprises addresses of a plurality of second data pools, and the transmitting further comprises:
    determining, by the first consensus node, target consensus nodes respectively corresponding to the addresses of the plurality of second data pools; and
    transmitting, by the first consensus node, the service data to the target consensus nodes.

15. The computer-readable storage medium of claim 12, wherein before the determining, the method comprises:
    splitting, by the first consensus node, the trie tree, to obtain a plurality of subtrees which do not comprise the first leaf node;
    for any subtree in the plurality of subtrees, determining, by the first consensus node, a preset quantity of leaf nodes from leaf nodes comprised by the any subtree; and
    generating, by the first consensus node, a routing and forwarding table corresponding to the any subtree according to the addresses of the data pools correspondingly represented by the preset quantity of leaf nodes.

16. The computer-readable storage medium of claim 15, wherein the splitting further comprises:
    splitting, by the first consensus node, the trie tree layer by layer from the root node of the trie tree by using the first leaf node as a benchmark;
    determining, by the first consensus node, whether each layer of subtrees obtained in a splitting process comprises the first leaf node, splitting continuously subtrees which comprise the first leaf node, and stopping splitting until the trie tree is split to the first leaf node; and
    obtaining, by the first consensus node, the plurality of subtrees which do not comprise the first leaf node during stopping splitting.

17. The computer-readable storage medium of claim 12, wherein the determining, by a first consensus node when service data is received, a target data pool corresponding to the service data comprises:
    obtaining, by the first consensus node in the case that the service data is received, a hash value of the service data; and
    querying, by the first consensus node, a second leaf node corresponding to the hash value from the trie tree, and using a data pool correspondingly represented by the second leaf node as the target data pool, wherein the second leaf node comprises at least one leaf node.

18. The computer-readable storage medium of claim 12, wherein the data routing method is applicable to a blockchain network, the blockchain network comprising the plurality of consensus nodes.

19. The computer-readable storage medium of claim 12, wherein the plurality of subtrees do not comprise the first leaf node.

20. A data routing apparatus comprising:
    a receiving module configured to receive service data;

a determining module configured to determine a target data pool corresponding to the service data in response to the receiving module receiving the service data, wherein a blockchain network comprises a plurality of consensus nodes and a first consensus node is any one of the plurality of consensus nodes, further wherein the plurality of consensus nodes maintain respectively corresponding data pools, and the apparatus;

an obtaining module, configured to obtain an address of a second data pool from a plurality of routing and forwarding tables according to a shortest prefix of the target data pool, wherein the plurality of routing and forwarding tables correspond to a plurality of subtrees of a trie tree, further wherein the trie tree comprises a plurality of leaf nodes that correspond to the data pools of the consensus nodes one by one, further wherein a leaf node corresponding to the second data pool and a leaf node corresponding to the target data pool are in a same subtree, further wherein the plurality of subtrees are obtained by splitting the trie tree from a root node by using a first leaf node corresponding to a data pool of a first consensus node as a benchmark, further wherein the routing and forwarding tables are configured to record addresses of data pools represented by a preset quantity of leaf nodes in the corresponding subtrees; and a transmit module configured to transmit the service data to one of the consensus nodes corresponding to the address of the second data pool.

* * * * *